United States Patent
Sun et al.

(10) Patent No.: US 6,442,048 B1
(45) Date of Patent: Aug. 27, 2002

(54) FLYBACK CONVERTER WITH SYNCHRONOUS RECTIFYING FUNCTION

(75) Inventors: Xiaodong Sun; Xiaojian Zhao, both of Taipei Hsien (TW)

(73) Assignee: Lite-On Electronics, Inc., Taipei Hsien (TW)

( * ) Notice: Subject to any disclaimer, the term of this patent is extended or adjusted under 35 U.S.C. 154(b) by 0 days.

(21) Appl. No.: 10/020,233

(22) Filed: Dec. 18, 2001

(51) Int. Cl.⁷ .............................................. H02M 3/335
(52) U.S. Cl. ................................................... 363/21.14
(58) Field of Search .......................... 363/21.14, 21.17, 363/21.12

(56) References Cited

U.S. PATENT DOCUMENTS 5,237,606 A * 8/1993 Ziermann ................ 363/21.14
6,353,544 B1 * 3/2002 Lau ........................ 363/21.12

* cited by examiner

*Primary Examiner*—Shawn Riley
(74) *Attorney, Agent, or Firm*—Rosenberg, Klein & Lee

(57) ABSTRACT

A flyback converter with synchronous rectifying function comprises a flyback converter, a controllable unit, a controller and a comparator. The controllable unit is connected to a negative pole of a second auxiliary winding of a secondary winding of a transformer in the flyback converter, a gate of a MOS transistor and an output of the comparator. The controller is connected to the gate of the MOS transistor, the ground and a negative pole of a second winding of a current transformer in the flyback converter. The comparator has one input for providing a check voltage and connected to a junction of a diode and a resistor, and another input for providing a reference voltage.

4 Claims, 2 Drawing Sheets

FLYBACK CONVERTER WITH SYNCHRONOUS RECTIFYING FUNCTION

FIELD OF THE INVENTION

The present invention relates to a flyback converter with synchronous rectifying function, especially to a flyback converter with synchronous rectifying function to enhance efficient and reduce power consumption at empty load condition.

BACKGROUND OF THE INVENTION

The flyback converter with rectifying device is extensively used for power supplies. FIG. 1 shows the circuit diagram of a prior art flyback converter with rectifying device. When the gate of the thyristor M1 is triggered and the thyristor M1 is turned on, the positive pole of the auxiliary winding N1 on the secondary side of the transformer T is high. The high voltage turns on a controllable unit Si through a resistor R2. Therefore, a MOS transistor SR is turned off.

On the contrary, when the gate of the thyristor M1 is turned off, the negative pole of the middle auxiliary winding N2 on the secondary side of the transformer T is high. The high voltage turns on the MOS transistor SR through a diode D1 and a resistor R1.

However, the MOS transistor SR has considerable inversed current when it is turned off. The synchronous rectifying effect of the rectifying device is degraded by the extra power consumption. Moreover, the MOS transistor SR has power consumption at empty load.

FIG. 2 shows the circuit diagram of another prior art rectifying device for flyback converter. When the gate of the thyristor M1 is turned off, the negative pole of the second auxiliary winding N1 on the secondary side of a transformer T is high. The high voltage turns on the MOS transistor SR through a diode D1 and a resistor R1. At this time, a current transformer TA senses a reversed output current and the negative pole on the secondary side of the current transformer TA is high. The high voltage turns a controllable unit S1 through a resistor R2. Therefore, a MOS transistor SR is turned off.

However, the MOS transistor SR still has considerable power consumption at empty load.

SUMMARY OF THE INVENTION

It is an object of the present invention to provide a flyback converter with synchronous rectifying function and enhanced efficiency. The problem of large reversed current in MOS transistor is solved and the MOS transistor is turned off at low load condition to reduce power consumption.

It is another object of the present invention to provide a flyback converter with synchronous rectifying function. At switching instance, a small reversed current is present at a secondary winding of a transformer to provide resonance energy for an inductor of a primary winding and a parasite. A thyristor can be turned on at low voltage to reduce power consumption for turning on the thyristor.

The various objects and advantages of the present invention will be more readily understood from the following detailed description when read in conjunction with the appended drawing, in which:

DETAILED DESCRIPTION OF THE INVENTION

Figure 1:
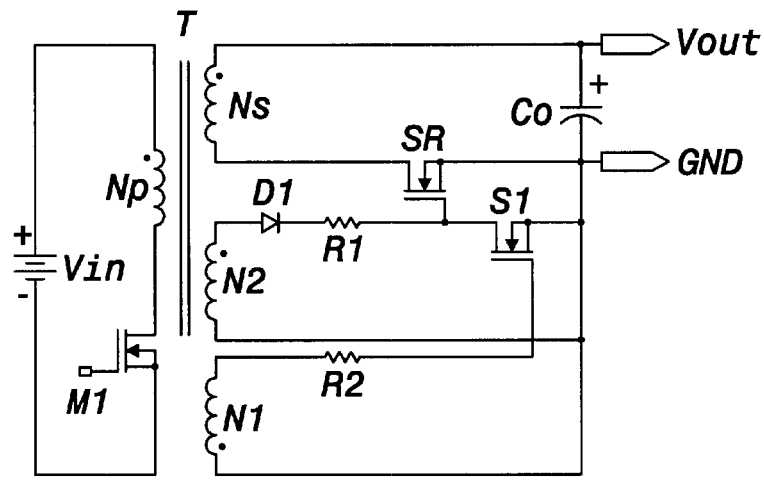
FIG. 1 shows the circuit diagram of a prior art flyback converter with rectifying device.
Figure 2:
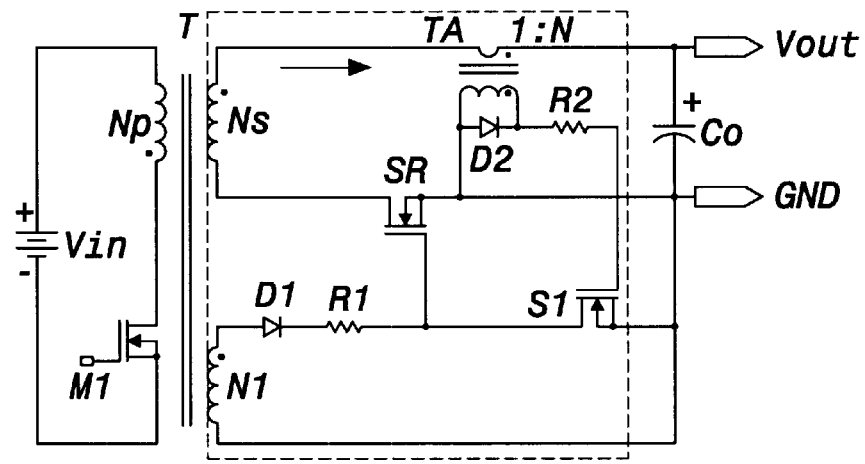
FIG. 2 shows the circuit diagram of another prior art rectifying device for flyback converter.
Figure 3:
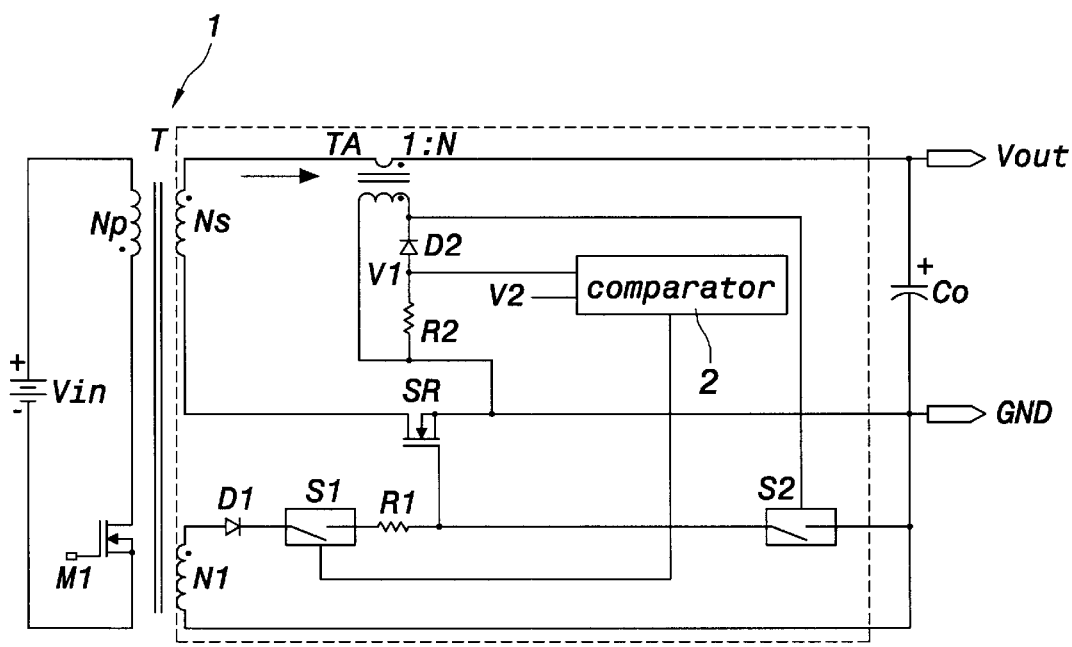
FIG. 3 shows a block diagram of the present inventions.
Figure 4:
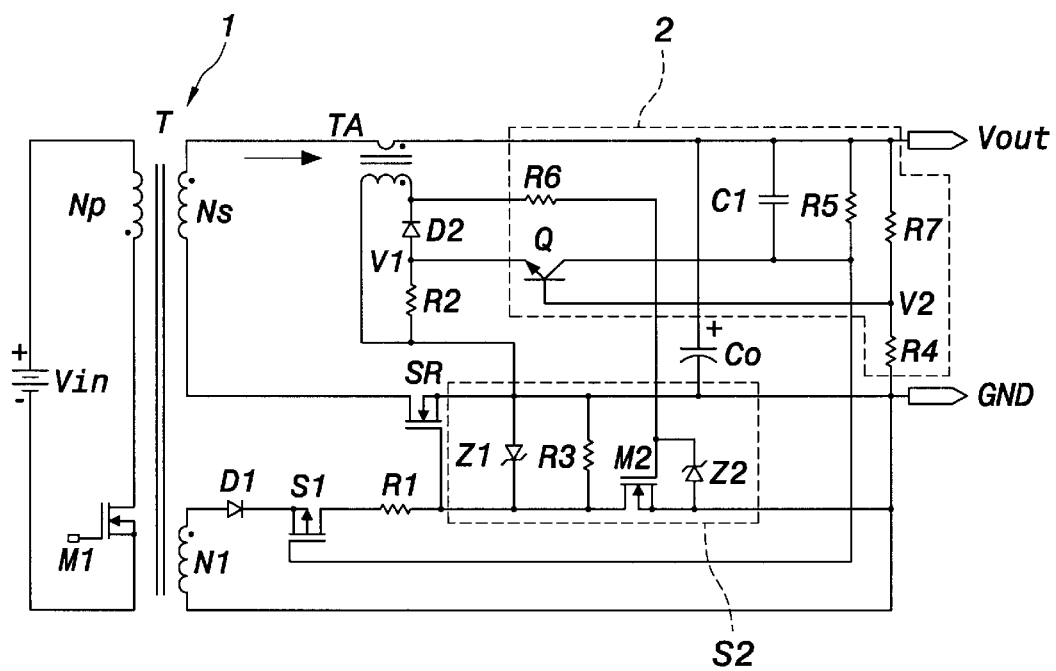
FIG. 4 shows a circuit diagram of the present inventions.

With reference to FIGS. 3 and 4, the present invention is intended to provide a synchronous rectifying device for flyback converter. The synchronous rectifying device for flyback converter comprises a flyback converter 1, a controllable unit S1, a controller S2 and a comparator 2.

The flyback converter 1 has a transformer T and the primary winding NP has a negative pole connected to a drain of the thyristor M1. The source of the thyristor M1 is connected to the negative pole of the input voltage Vin. The positive pole of the primary winding NP is connected to the positive pole of the input voltage Vin. The secondary winding of the transformer T comprises a first auxiliary winding NS and the negative pole of the first auxiliary winding NS is connected to the positive pole of the primary winding of a current transformer TA. The negative pole of the secondary winding of the current transformer TA is connected to a diode D2 and a resistor R2. The positive pole of the first auxiliary winding NS is connected to the drain of a MOS transistor SR. The source of the MOS transistor SR is connected to the positive pole of the secondary winding of the current transformer TA and connected to ground. The negative pole of a second auxiliary winding N1 of the secondary winding of the transformer T is connected to the positive pole of a diode D1. The positive pole of the second auxiliary winding N1 is connected to ground.

When the thyristor M1 is turned off, a high-level voltage is induced at the secondary winding of the transformer T and a current flows through the diode D2 and the resistor R2.

The controllable unit S1 is a PMOS transistor with a source connected to the negative pole of the diode D1 and a drain connected to the gate of the MOS transistor SR through a transistor R1. The controllable unit S1 can be turned on or off by a voltage applied to the gate thereof.

The controller S2 comprises an NMOS transistor M2, two Zener diodes Z1, Z2 and a resistor R3. The NMOS transistor M2 has a source connected to ground, a drain connected to the gate of the MOS transistor SR, and a gate connected to the negative pole of the secondary winding of the current transformer TA. The controller S2 can be turned on or off by a voltage applied thereto.

The comparator 2 comprises a transistor Q, resistors R4, R7, and a capacitor C1 and has two inputs. One of the inputs is connected to the joint of the diode D2 and the resistor R2 and provides check voltage V1. Another one of the inputs is connected to the joint of the resistors R4, R7 and provides a reference voltage V2. The output of the comparator 2 is connected to the gate of the controllable unit S1.

When the thyristor M1 is turned off, the negative pole of the second auxiliary winding N1 of the secondary winding of the transformer T is at high level and the negative pole of the first auxiliary winding NS of the secondary winding of the transformer T is also at high level. Therefore, a current flows from the negative pole of the secondary winding of the current transformer TA and through the diode D2 and the resistor R2.

If the load is low, the check voltage V1 is lower than the reference voltage V2 and the comparator 2 outputs a voltage at low level to turn off the controllable unit S1. The MOS transistor SR is also turned off to reduce power consumption at low load condition. In other word, the MOS transistor SR can be controlled by the turn ratio of the current transformer TA, the check voltage V1 and the reference voltage V2.

If the load is heavy, the check voltage V1 is higher than the reference voltage V2 and the comparator 2 outputs a voltage at high level to turn on the controllable unit S1 and turn off the controller S2. The MOS transistor SR is also turned on.

If the thyristor M1 is turned on instantaneously, the MOS transistor SR is still on. The drain of the MOS transistor SR has a higher voltage than that of the source of the MOS transistor SR and a reversed current flows through the current transformer TA. At this time, the negative pole of the secondary winding of the current transformer TA is high to turn on the controller S2. Therefore, the MOS transistor SR is turned off.

To sum up, the flyback converter with synchronous rectifying function has following advantages:

(1) The flyback converter has excellent synchronous rectifying effect to enhance switching efficiency.

(2) The MOS transistor SR can be turned off to reduce power consumption at low load condition.

(3) At switching instance, a small reversed current is present at the secondary winding of the transformer T to provide resonance energy for the inductor of the primary winding and the parasite. The thyristor can be turned on at low voltage to reduce power consumption for turning on the thyristor.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A flyback converter with synchronous rectifying function, comprising a flyback converter having a transformer, the transformer having a primary winding with a negative pole connected to a thyristor, the transformer having a secondary winding having a first auxiliary winding with a positive pole connected to a drain of a MOS transistor, the MOS transistor having a source connected to ground, the first auxiliary winding having a negative pole connected to a positive pole of a primary winding of a current transformer, the current transformer having a secondary winding connected to a diode and a resistor, the secondary winding of the current transformer having a positive pole connected to ground, the secondary winding of the transformer having a second auxiliary winding with a positive pole connected to ground, when the thyristor is turned off, a voltage with a high level is induced at the secondary winding of the transformer and a current flows through the diode and the resistor;

a controllable unit connected between a negative pole of the second auxiliary winding of the secondary winding of the transformer and a gate of the MOS transistor, the controllable unit having a control terminal and being turned on or off by a voltage at the control terminal thereof;

a controller connected between the gate of the MOS transistor and ground, the controller having a control terminal connected to a negative pole of the second winding of the current transformer, the controller being turned on or off by a voltage at the control terminal thereof;

a comparator having one input for providing a check voltage and connected to a junction of the diode and the resistor, another input for providing a reference voltage, and an output connected to the control terminal of the controllable unit;

when the output load of the flyback converter is low and the check voltage is lower than the reference voltage, the comparator turns off the controllable unit to turn off the MOS transistor.

2. The flyback converter with synchronous rectifying function as in claim 1, wherein the controllable unit is a PMOS transistor.

3. The flyback converter with synchronous rectifying function as in claim 1, wherein the controller comprises an NMOS transistor, the NMOS transistor having a source connected to ground, a drain connected to control terminal of the controllable unit, and a gate connected to the negative pole of the secondary winding of the current transformer.

4. The flyback converter with synchronous rectifying function as in claim 1, wherein the comparator comprises a transistor with a base connected to two resistors, a collector connected to the control terminal of the controllable unit, and an emitter connected to the junction of the diode and the resistor.

* * * * *